United States Patent
Sun et al.

(10) Patent No.: US 11,249,220 B2
(45) Date of Patent: Feb. 15, 2022

(54) CORRELATION MATRIX FOR SIMULTANEOUSLY CORRELATING MULTIPLE WELLS

(71) Applicant: Chevron U.S.A. Inc., San Ramon, CA (US)

(72) Inventors: Tao Sun, Houston, TX (US); Lewis Li, Houston, TX (US); Brett M. Hern, Porter, TX (US); Fabien J. Laugier, Houston, TX (US); Maisha Lara Amaru, Houston, TX (US); Ashley D. Harris, Houston, TX (US); Morgan David Sullivan, Spring, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 188 days.

(21) Appl. No.: 16/541,053

(22) Filed: Aug. 14, 2019

(65) Prior Publication Data

US 2021/0048556 A1 Feb. 18, 2021

(51) Int. Cl.
*G06F 17/16* (2006.01)
*G01V 99/00* (2009.01)
(Continued)

(52) U.S. Cl.
CPC .......... *G01V 99/005* (2013.01); *G06F 17/153* (2013.01); *G06F 17/16* (2013.01); *G06F 2111/10* (2020.01)

(58) Field of Classification Search
CPC .......... G01V 99/005; G01V 1/50; G01V 1/40; G06F 17/16; G06F 17/153; G06F 2111/10; E21B 47/00; E21B 49/00; E21B 2200/20
See application file for complete search history.

(56) References Cited

U.S. PATENT DOCUMENTS 2,653,220 A 9/1953 Bays
7,079,953 B2 7/2006 Thorne
(Continued)

FOREIGN PATENT DOCUMENTS

CN 102540256 7/2012
CN 103454678 12/2013
(Continued)

OTHER PUBLICATIONS

Scheevel et al., Principal Component Analysis Applied to 3D Seismic Data for Reservoir Property Estimation, Feb. 1, 2001, SPE Reservoir Evaluation & Engineering 4 (01), pp. 64-72 (Year: 2001).*

(Continued)

*Primary Examiner* — Toan M Le
(74) *Attorney, Agent, or Firm* — Esplin & Associates, PC

(57) ABSTRACT

Correlation matrices may be used to simultaneously correlate multiple wells. A correlation matrix may be generated for individual pairs of multiple wells. The values of elements of the correlation matrices may be determined based on matching between segments of the multiple wells and segments of one or more computational stratigraphic models. An N-dimensional space including an axis for individual wells may be generated. Directed walk may be performed within the N-dimensional space to generate paths representing scenarios of correlations for segments of the multiple wells.

18 Claims, 8 Drawing Sheets

(51) Int. Cl.
*G06F 17/15* (2006.01)
*G06F 111/10* (2020.01)

(56) References Cited

U.S. PATENT DOCUMENTS

| | | | |
|---|---|---|---|
| 7,516,055 | B2 | 4/2009 | Strebelle |
| 7,706,981 | B2 | 4/2010 | Wilkinson |
| 8,271,244 | B2 | 9/2012 | Ross |
| 8,666,149 | B2 | 3/2014 | Thorne |
| 9,187,984 | B2 | 11/2015 | Usadi |
| 9,753,180 | B2 | 9/2017 | Suzuki |
| 9,804,282 | B2 | 10/2017 | Xu |
| 10,036,829 | B2 | 7/2018 | Ghayour |
| 10,190,403 | B2 | 1/2019 | Samuel |
| 10,287,858 | B2 | 5/2019 | Ghayour |
| 10,317,569 | B2 | 6/2019 | Sun |
| 10,319,143 | B2 | 6/2019 | Branets |
| 10,365,261 | B2 | 7/2019 | Montgomery |
| 10,816,440 | B2 | 10/2020 | Amendt |
| 10,984,590 | B1 | 4/2021 | Li |
| 11,010,969 | B1 | 5/2021 | Li |
| 2002/0013687 | A1 | 1/2002 | Ortoleva |
| 2005/0180261 | A1 | 8/2005 | Mandal |
| 2006/0041409 | A1 | 2/2006 | Strebelle |
| 2006/0052938 | A1 | 3/2006 | Thorne |
| 2007/0100593 | A1 | 5/2007 | Deffenbaugh |
| 2008/0015784 | A1 | 1/2008 | Dorn |
| 2009/0262603 | A1 | 10/2009 | Hurley |
| 2009/0306945 | A1 | 12/2009 | Wu |
| 2009/0319243 | A1 | 12/2009 | Suarez-Rivera |
| 2010/0149917 | A1 | 6/2010 | Imhof |
| 2010/0332205 | A1 | 12/2010 | Tillier |
| 2011/0002194 | A1 | 1/2011 | Imhof |
| 2011/0054857 | A1 | 3/2011 | Moguchaya |
| 2011/0054869 | A1 | 3/2011 | Li |
| 2011/0213600 | A1 | 9/2011 | Strebelle |
| 2011/0231164 | A1 | 9/2011 | Zhang |
| 2011/0240310 | A1 | 10/2011 | Sun |
| 2011/0264430 | A1 | 10/2011 | Tapscott |
| 2011/0272161 | A1 | 11/2011 | Kumaran |
| 2012/0029828 | A1 | 2/2012 | Pepper |
| 2012/0215628 | A1 | 8/2012 | Williams |
| 2012/0221302 | A1 | 8/2012 | Lewandowski |
| 2012/0221306 | A1 | 8/2012 | Hurley |
| 2013/0064040 | A1 | 3/2013 | Imhof |
| 2013/0118736 | A1 | 5/2013 | Usadi |
| 2013/0151161 | A1 | 6/2013 | Imhof |
| 2013/0179080 | A1 | 7/2013 | Skalinski |
| 2013/0294197 | A1 | 11/2013 | Vallikkat Thachaparambil |
| 2013/0318141 | A1 | 11/2013 | Maucec |
| 2013/0329986 | A1 | 12/2013 | Strebelle |
| 2014/0035912 | A1 | 2/2014 | Thorne |
| 2014/0316706 | A1 | 10/2014 | Grant |
| 2014/0358440 | A1 | 12/2014 | Pyrcz |
| 2015/0066460 | A1 | 3/2015 | Klinger |
| 2015/0088424 | A1 | 3/2015 | Burlakov |
| 2015/0112656 | A1 | 4/2015 | Rodriguez-Herrera |
| 2015/0212231 | A1 | 7/2015 | Borouchaki |
| 2015/0219793 | A1 | 8/2015 | Li |
| 2015/0309197 | A1 | 10/2015 | Dimitrov |
| 2016/0041279 | A1 | 2/2016 | Casey |
| 2016/0048933 | A1 | 2/2016 | Strebelle |
| 2016/0103245 | A1 | 4/2016 | Pyrcz |
| 2016/0139299 | A1 | 5/2016 | Leger |
| 2016/0313463 | A1 | 10/2016 | Wahrmund |
| 2017/0011149 | A1 | 1/2017 | Liu |
| 2017/0153343 | A1 | 6/2017 | Almarhoon |
| 2017/0205531 | A1 | 7/2017 | Berard |
| 2018/0003839 | A1 | 1/2018 | Lowell |
| 2018/0217283 | A1 | 8/2018 | Klinger |
| 2018/0225778 | A1 | 8/2018 | Grant |
| 2018/0334902 | A1 | 11/2018 | Olsen |
| 2019/0026405 | A1 | 1/2019 | Ramsay |
| 2019/0094414 | A1 | 3/2019 | Prochnow |
| 2019/0243028 | A1 | 8/2019 | Von Gonten |
| 2020/0380390 | A1 | 12/2020 | Sun |
| 2021/0222523 | A1 | 7/2021 | Sun |
| 2021/0223431 | A1 | 7/2021 | Hern |

FOREIGN PATENT DOCUMENTS

| | | |
|---|---|---|
| CN | 103454686 | 12/2013 |
| CN | 104111473 | 10/2014 |
| CN | 105372705 | 3/2016 |
| CN | 105717542 | 6/2016 |
| CN | 105954802 | 9/2016 |
| CN | 107942382 | 4/2018 |
| CN | 107976713 | 5/2018 |
| EP | 2917770 | 9/2015 |
| FR | 3039679 | 2/2017 |
| GB | 2474740 | 4/2011 |
| WO | 2017019718 | 2/2017 |
| WO | 2018208634 | 11/2018 |

OTHER PUBLICATIONS

One Petro Search Results, Jun. 15, 2021, 8 pp. (Year: 2021).*
PCT International Search Report and Written Opinion, International Application No. PCT/US2020/61489, dated Jan. 28, 2021 (7 pages).
PCT International Search Report and Written Opinion, International Application No. PCT/US2020/61323, dated Feb. 19, 2021 (8 pages).
PCT International Search Report and Written Opinion, International Application No. PCT/US21/12733, dated Mar. 23, 2021 (11 pages).
Tahmasebi et al. Multiple-point geostatistical modeling based on the cross-correlation 1-15 functions. Mar. 8, 2012 (Mar. 8, 2012). [retrieved on Mar. 5, 2021]. Retrieved from the Internet: <URL: http:/lwww.uwyo.edu/pejman/_files/docs/tahmasebi_ccsim.pdf> pp. 779-796.
Zhou et al. A Stratigraphic Prediction Method Based on Machine Learning. Aug. 29, 2019 1-15 (Aug. 29, 2019). (retrieved on Mar. 5, 2021]. Retrieved from the Internet: <URL: https://www.mdpi.eom/2076-3417/9/17/3553/pdf> pp. 1-29.
Zhou et al. A Stratigraphic Prediction Method Based on Machine Learning. Aug. 29, 2019 (Aug. 29, 2019). [retrieved on Mar. 5, 2021]. Retrieved from the Internet: <URL: https://www.mdpi.com/2076-3417/9/17/3553/pdf> pp. 1-29.
Efros, A. A., & Freeman, W. T. (2001). Image quilting for texture synthesis and transfer. Proceedings of the 28th Annual Conference on Computer Graphics and Interactive Techniques—Siggraph '01, 341-346. https://doi.org/10.1145/383259.383296.
Hoffimann, J., Scheidt, C., Barfod, A., & Caers, J. (2017). Stochastic simulation by image quilting of process-based geological models. Computers and Geosciences, 106(February), 18-32. https://doi.org/10.1016/j.cageo.2017.05.012.
Mariethoz, G., Renard, P., & Straubhaar, J. (2010). The direct sampling method to perform multiple-point geostatistical simulations. Water Resources Research, 46(11). https://doi.org/10.1029/2008WR007621.
Mahmud, K., Mariethoz, G., Caers, J., Tahmasebi, P., & Baker, A. (2014). Simulation of Earth textures by conditional image quilting. Water Resources Research, 50(4), 3088-3107. https://doi.org/10.1002/2013WR015069.
Bertoncello, Antoine , Caers, Jef, Biver, Pierre, CaumonGuillaume, (2008). Geostatistics on Stratigraphic Grid. ERE department / Stanford University (pp. 1-16).
Liu et al. "Visual Analytics of Stratigraphic Correlation for Multi-attribute Well-logging Data Exploration." Jul. 2019 IEEE Access PP(99):1-1, Jul. 16, 2019, [online] [retrieved on Oct. 5, 2020 (Oct. 5, 2020)) Retrieved from the Internet< URL: https://ieeexplore.ieee.org/document/8764395>. entire document (13 pages).
PCT International Search Report and Written Opinion, International Application No. PCT/US20/44874, dated Dec. 17, 2020. (8 pages).
PCT International Search Report and Written Opinion, International Application No. PCT/US20/61212, dated Dec. 21, 2020. (7 pages).
Ana-Maria Ilisei et al., Automatic Classification of Subsurface Features in Radar Sounder Data Acquired in Icy Areas, 2013, IEEE, pp. 3530-3533 (Year: 2013).

(56) References Cited

OTHER PUBLICATIONS

Hawie, Nicolas, Jacob Covault, Dallas Dunlap, and Zoltan Sylvester 2017. "Slope-fan Depositional Architecture from High-resolution Forward Stratigraphic Models". EarthArXiv. Dec. 19. eartharxiv.org/f9dkp. (36 pages).

Yupeng, Li, and Wu Shenghe. "Hierarchical nested simulation approach in reservoir architecture modeling." Petroleum Exploration and Development 40, No. 5 (2013): 676-681.

Sacchi, Quinto, Eloisa Salina Borello, Gert Jan Weltje, and Rory Dalman. "Increasing the predictive power of geostatistical reservoir models by integration of geological constraints from stratigraphic forward modeling." Marine and Petroleum Geology 69 (2016): 112-126.

Harris S, Santoshini S, Kashem S, Viard T, Levannier A, Benabbou A. Complex geological modeling and quality assurance using unstructured grids. InAbu Dhabi International Petroleum Exhibition & Conference Nov. 12, 2018. Society of Petroleum Engineers. 20 pages.

Rubio, R.H., Koppe, V.C., Costa, J.F.C.L. and Cherchenevski, P.K., 2015. How the use of stratigraphic coordinates improves grade estimation. Rem: Revista Escola de Minas, 68(4), pp. 471-477.

Santoshini S, Harris S, Kashem S, Levannier A, Benabbou A, Viard T, Mace L. Depogrid: Next Generation Unstructured Grids for Accurate Reservoir Modeling and Simulation. InSPE Russian Petroleum Technology Conference Oct. 15, 2018. Society of Petroleum Engineers. 20 pages.

PCT International Search Report and Written Opinion, International Application No. PCT/US20/31869, dated Aug. 4, 2020. 2 pages.

PCT International Search Report and Written Opinion for Application No. PCT/US21/23008, dated Jun. 8, 2021 (8 pages).

PCT International Search Report and Written Opnion for Application No. PCT/US21/29956, dated Aug. 2, 2021 (7 pages).

Ou et al. "Fine reservoir structure modeling based upon 3D visualized stratigraphic correlation between horizontal wells: methodology and its application" Journal of Geophysics and Engineering J. Geophys Eng. 14 (2017) 1557-1571 (15pp). (Year: 2017).

\* cited by examiner

CORRELATION MATRIX FOR SIMULTANEOUSLY CORRELATING MULTIPLE WELLS

FIELD

The present disclosure relates generally to the field of correlating multiple wells using computational stratigraphic models.

BACKGROUND

Correlation of different wells using well logs and/or well cores may provide insights on whether and/or how different segments of the wells are linked together. Lithostratigraphic correlations of wells may result in erroneous representations of the spatial distributions of rock properties and/or internal structure of a reservoir. Direct matching of multiple wells with computational stratigraphic models may limit the total number of wells that may be correlated. For example, greater number of wells may reduce the probability that all of the wells may be matched simultaneously in one computational stratigraphic model. Correlating multiple wells by consecutively correlating pairs of wells may produce unrealistic results.

SUMMARY

This disclosure relates to correlating multiple wells. Model information, well information, and/or other information may be obtained. The model information may define a set of computational stratigraphic models. Individual computational stratigraphic models may include multiple digital wells. The set of computational stratigraphic models may include a first computational stratigraphic model and/or other computational stratigraphic models. The well information may define segments of multiple wells. The multiple wells may include a first well, a second well, and/or other wells. A set of correlation matrices may be generated. The set of correlation matrices may include a correlation matrix for individual pairs of the multiple wells. The set of correlation matrices may include a first correlation matrix for the first well and the second well and/or other correlation matrices for other pairs of the multiple wells. A dimension of a correlation matrix may be defined by numbers of segments of the individual pairs of the multiple wells.

Element values of the set of correlation matrices may be determined based on matching between the segments of the multiple wells and segments of the multiple digital wells in the set of computational stratigraphic models, and/or other information. Element values of the first correlation matrix may be determined based on matching between the segments of the first well, the segments of the second well, and the segments of matched digital wells in the set of computational stratigraphic models, and/or other information. Correlations for the segments of the multiple wells may be determined based on the element values of the set of correlation matrices and/or other information.

A system that correlates multiple wells may include one or more electronic storage, one or more processors and/or other components. The electronic storage may store model information, information relating to computational stratigraphic models, information relating to digital wells, information relating to segments of digital wells, well information, information relating to wells, information relating to segments of wells, information relating to correlation matrices, information relating to elements values of correlation matrices, information relating to correlations for segments of wells, and/or other information.

The processor(s) may be configured by machine-readable instructions. Executing the machine-readable instructions may cause the processor(s) to facilitate correlating multiple wells. The machine-readable instructions may include one or more computer program components. The computer program components may include one or more of a model information component, a well information component, a generation component, a value component, a correlation component, and/or other computer program components.

The model information component may be configured to obtain model information and/or other information. The model information may define a set of computational stratigraphic models. Individual computational stratigraphic models may include multiple digital wells. The set of computational stratigraphic models may include a first computational stratigraphic model and/or other computational stratigraphic models.

The well information component may be configured to obtain well information and/or other information. The well information may define segments of multiple wells. The multiple wells may include a first well, a second well, and/or other wells.

The generation component may be configured to generate a set of correlation matrices. The set of correlation matrices may include a correlation matrix for individual pairs of the multiple wells. The set of correlation matrices may include a first correlation matrix for the first well and the second well, and/or other correlation matrices for other pairs of the multiple wells. A dimension of a correlation matrix may be defined by numbers of segments of the individual pairs of the multiple wells.

The value component may be configured to determine element values of the set of correlation matrices based on matching between the segments of the multiple wells and segments of the multiple digital wells in the set of computational stratigraphic models, and/or other information. Element values of the first correlation matrix may be determined based on matching between the segments of the first well, the segments of the second well, and the segments of matched digital wells in the set of computational stratigraphic models, and/or other information.

In some implementations, matching between the segments of the first well, the segments of the second well, and the segments of the matched digital wells in the set of computational stratigraphic models may include: matching between the segments of the first well and segments of a first digital well of the first computational stratigraphic model; matching between the segments of the second well and segments of a second digital well of the first computational stratigraphic model; and obtaining correlation between the segments of the first digital well and the segments of the second digital well from the first computational stratigraphic model.

In some implementations, the element values of the first correlation matrix may be initialized to zero. The element values of the first correlation matrix corresponding to matching between the segments of the first well, the segments of the second well, and the segments of the matched digital wells in the set of computational stratigraphic models may be incremented. In some implementations, the element values of the first correlation matrix may be normalized based on a number of scenarios of matching between the first well and the second well through the matched digital wells in the set of computational stratigraphic models and/or other information. In some implementations, one or more non-linear transformations may be applied to the element values of the first correlation matrix.

The correlation component may be configured to determine correlations for the segments of the multiple wells based on the element values of the set of correlation matrices and/or other information. In some implementations, determination of the correlations for the segments of the multiple wells based on the element values of the set of correlation matrices may include generation of paths within the set of correlation matrices. The paths may be generated based on a directed walk within the set of correlation matrices and/or other information. The directed walk may be performed probabilistically or deterministically. Individual ones of the paths may represent a scenario of the correlations for the segments of the multiple wells such that a first path within the first correlation matrix may represent a first scenario of the correlations for the segments of the first well and the segments of the second well.

In some implementations, determination of the correlations for the segments of the multiple wells based on the element values of the set of correlation matrices may include generation of an N-dimensional space. The N-dimensional space may include an axis corresponding to individual ones of the multiple wells. Vertices of the N-dimensional space may be projected onto the axis corresponding to the individual ones of the multiple wells and individual ones of the set of correlation matrices.

In some implementations, the directed walk within the set of correlation matrices may be performed within the N-dimensional space. The individual ones of the paths may represent a scenario of the correlations for the segments of all pairs of the multiple wells. In some implementations, the first scenario of the correlations for the segments of the first well and the segments of the second well may be determined based on a projection of the first path within the N-dimensional space to a surface defined by a first unit vector corresponding to the first well and a second unit vector corresponding to the second well, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to correlating multiple wells. Correlation matrices may be used to simultaneously correlate multiple wells. A correlation matrix may be generated for individual pairs of multiple wells. The values of elements of the correlation matrices may be determined based on matching between segments of the multiple wells and segments of multiple digital wells in one or more computational stratigraphic models. An N-dimensional space including an axis for individual wells may be generated. Directed walk may be performed within the N-dimensional space to generate paths representing scenarios of correlations for segments of the multiple wells.

Figure 1:
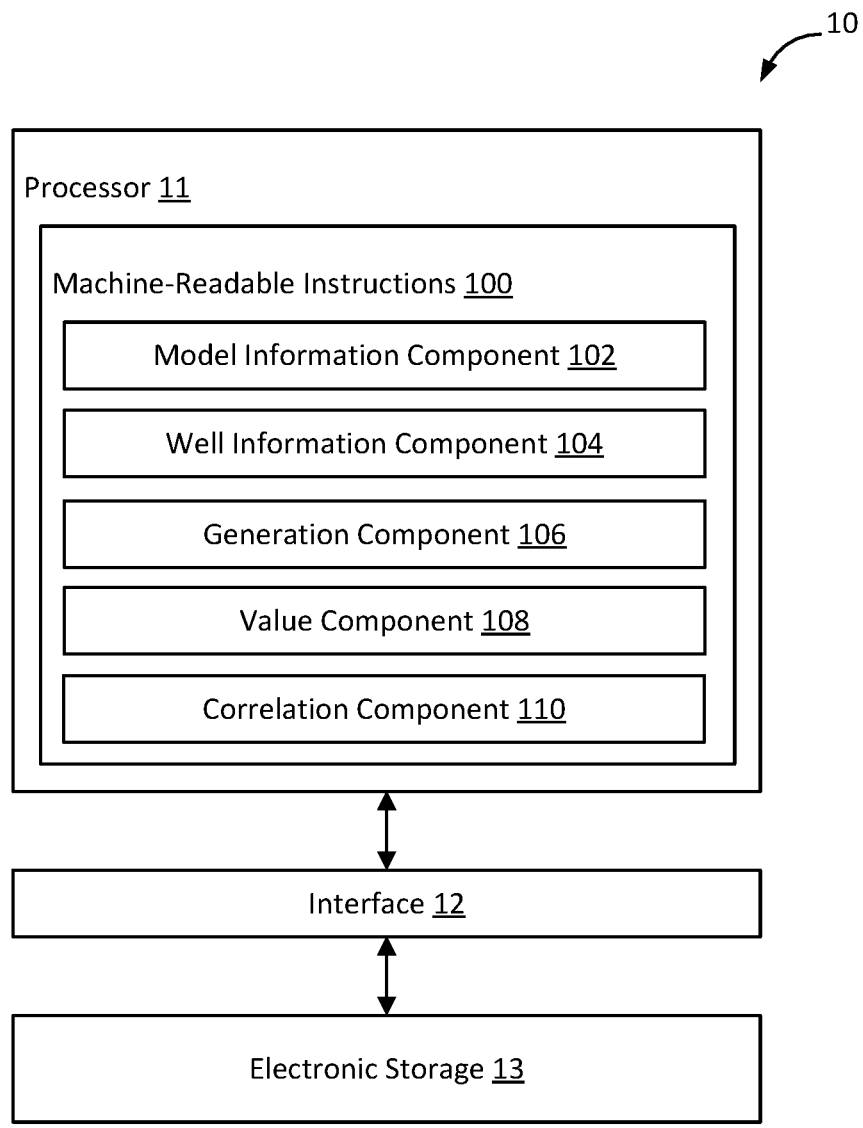
FIG. 1 illustrates an example system that correlates multiple wells.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Model information, well information, and/or other information may be obtained by the processor 11. The model information may define a set of computational stratigraphic models. Individual computational stratigraphic models may include multiple digital wells. The set of computational stratigraphic models may include a first computational stratigraphic model and/or other computational stratigraphic models. The well information may define segments of multiple wells. The multiple wells may include a first well, a second well, and/or other wells. A set of correlation matrices may be generated by the processor 11. The set of correlation matrices may include a correlation matrix for individual pairs of the multiple wells. The set of correlation matrices may include a first correlation matrix for the first well and the second well and/or other correlation matrices for other pairs of the multiple wells. A dimension of a correlation matrix may be defined by numbers of segments of the individual pairs of the multiple wells.

Element values of the set of correlation matrices may be determined by the processor 11 based on matching between the segments of the multiple wells and segments of the multiple digital wells in the set of computational stratigraphic models, and/or other information. Element values of the first correlation matrix may be determined based on matching between the segments of the first well, the segments of the second well, and the segments of matched digital wells in the set of computational stratigraphic models, and/or other information. Correlations for the segments of the multiple wells may be determined by the processor 11 based on the element values of the set of correlation matrices and/or other information.

A well may refer to a hole or a tunnel in the ground. A well may be drilled in the ground for exploration and/or recovery of natural resources in the ground. For example, a well may be drilled in the ground to aid in extraction of petrochemical fluid (e.g., oil, gas, petroleum, fossil fuel). A well may expose and/or run through different types of materials (e.g., sedimentary rocks) in the ground. The materials in the ground may be grouped into related packages. For example, rocks in the ground may be grouped into packages of rocks that are bounded by chronostratigraphic surface and/or sequence stratigraphic boundaries. Rocks may be related based on their depositions by the same flow and/or sediment transport event. Because the flow and the associated sediment transport are highly correlated spatially, the spatial distribution and spatial variabilities of the sedimentary rocks that are produced by the flow and sediment transport may be predicted.

Geologic analysis and/or reservoir characterization workflow may include determining correlations between segments of different wells. A segment of a well may refer to a part of the well (e.g., a vertical part of the well). A segment of a well may include and/or be defined by one or more materials within a part of the well (e.g., sedimentary rock within a part of the well). A segment of a well may include and/or be defined by one or more materials surrounding a part of the well (e.g., sedimentary rock surrounding a part of the well). A correlation between segments of wells may refer to connection, correspondence, and/or relationship between a segment of one well to a segment of another well. A segment of one well being correlated to a segment of another well may indicate that the two segments were deposited at the same time (chronostratigraphically) and/or have similar/related characteristics.

Correlation of well segments may be determined lithostratigraphically. Lithostratigraphic correlation of well segments may include correlation of well segments based solely on their physical and/or petrographic features. For example, segments of different wells may be linked together based on similarity of geo-patterns within the segments. However, such correlation of well segments may erroneously represent spatial distributions of rock properties and/or reservoir internal heterogeneity.

Figure 3A:
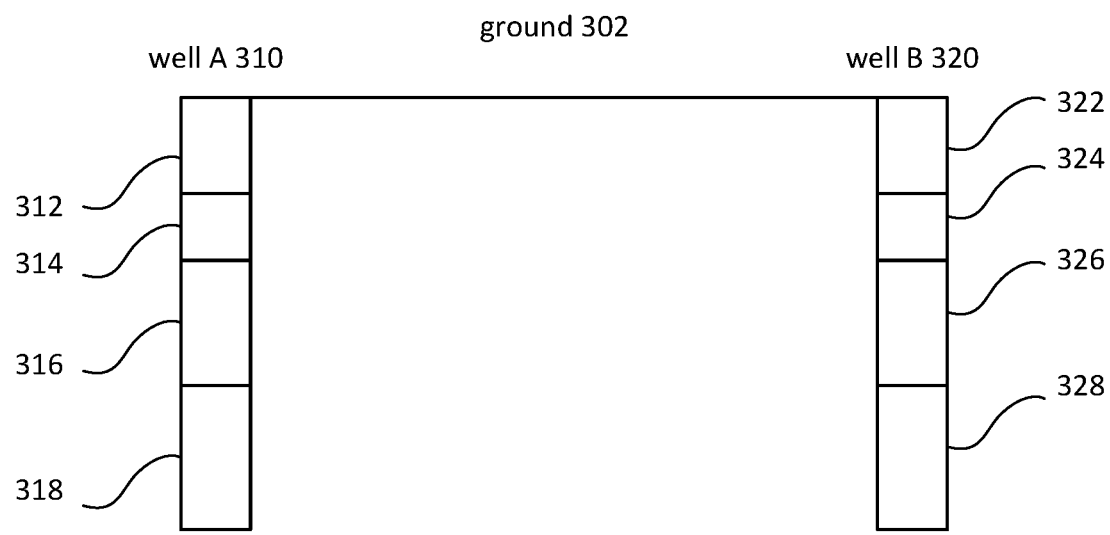
FIGS. 3A-3D illustrate example segments of two wells.
Figure 3B:
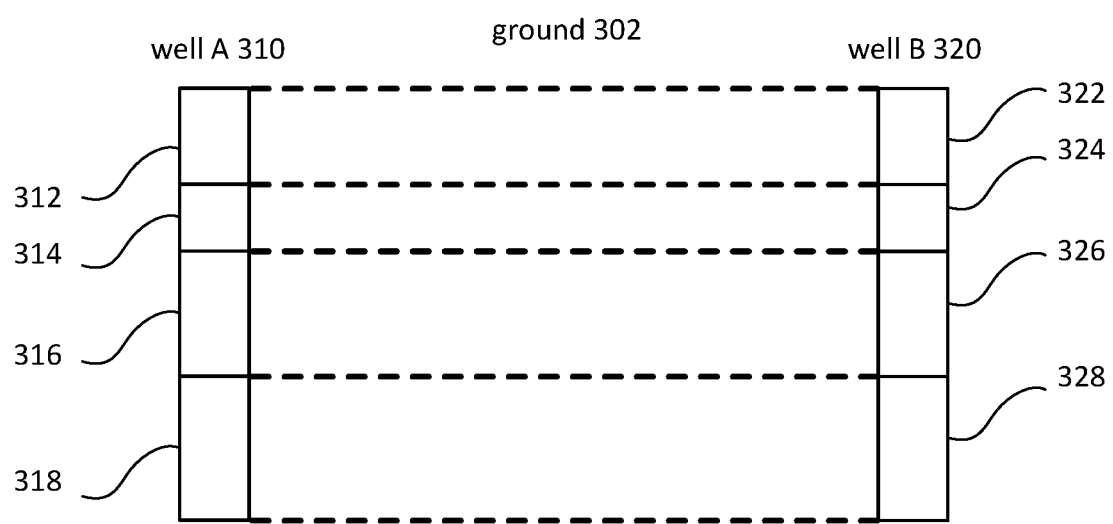

For example, FIGS. 3A-3D illustrate example segments of a well A 310 and a well B 320 drilled into ground 302. The well A 310 may include segments 312, 314, 316, 318, and the well B 320 may include segments 322, 324, 326, 328. As shown in FIG. 3B, lithostratigraphic correlation of segments of wells A 310 and well B 320 may result in linking of the segment 312 to the segment 322, linking of the segment 314 to the segment 324, linking of the segment 316 to the segment 326, and the linking of the segment 318 to the segment 328. Such linking of well segments may result in a railway track style of correlation where the rock packages in the well A 310 is linked to similar rock packages in the well B 320, which may imply that the linked well segments are connected.

Figure 3C:
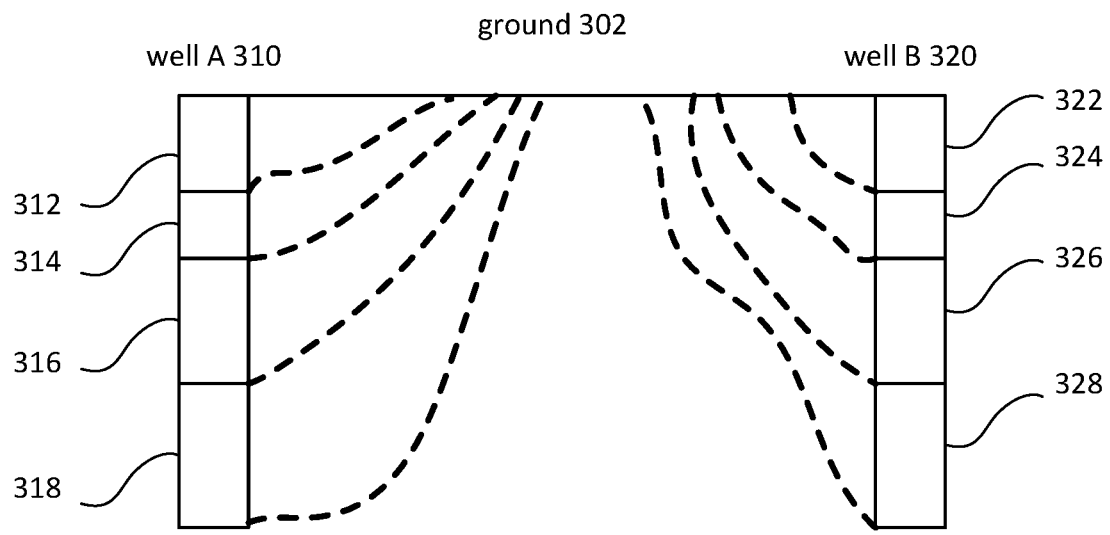
Figure 3D:
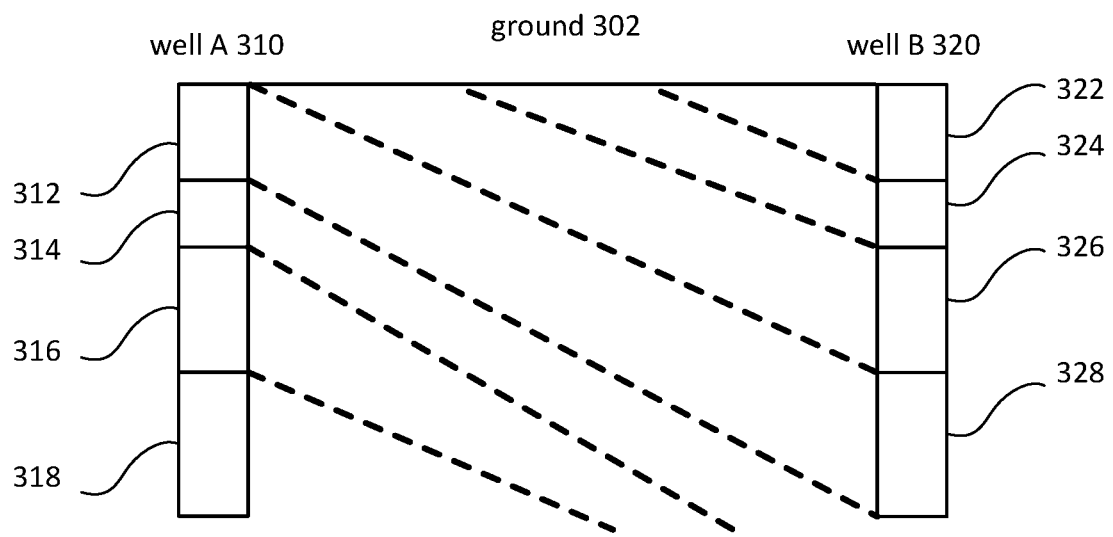

Such representation of spatial distributions of rock properties and/or reservoir internal heterogeneity may not be correct. For example, FIGS. 3C and 3D illustrate alternative spatial distributions of rock properties and/or reservoir internal heterogeneity between the well A 310 and the well B 320. In FIG. 3C, the well A 310 and the well B 320 may be drilled into the ground with similar properties/characteristics (e.g., delta lobes of a delta plain). However, the well A 310 and the well B 320 may be physically separated (e.g., separated by fringing parts of the delta lobes) and the segments 312, 314, 316, 318 of the well A 310 may not be connected to the segments 322, 324, 326, 328 of the well B 320. In FIG. 3D, the well A 310 and the Well B 320 may be drilled into the ground with deposited layers being slanted with respect to the ground 302. The segment 312 of the well A 310 may correlate to the segment 328 of the well B 320 (rather than the segment 322). The segments 322, 324, 326 of the well B 310 may not correlate to any segments of the well A 310. The segments 314, 316, 318 of the well A 310 may or may not correlate to segments of the well B 320 below the segment 328.

Referring back to FIG. 1, the electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store model information, information relating to computational stratigraphic models, information relating to digital wells, information relating to segments of digital wells, well information, information relating to wells, information relating to segments of wells, information relating to correlation matrices, information relating to elements values of correlation matrices, information relating to correlations for segments of wells, information relating to N-dimensional space, information relating to directed walk, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate correlating multiple wells. The machine-readable instructions 100 may include one or more computer program components. The machine-readable instructions 100 may include one or more of a model information component 102, a well information component 104, a generation component 106, a value component 108, a correlation component 110, and/or other computer program components.

The model information component 102 may be configured to obtain model information and/or other information. Obtaining model information may include one or more of accessing, acquiring, analyzing, determining, examining, identifying, loading, locating, opening, receiving, retrieving, reviewing, storing, utilizing, and/or otherwise obtaining the model information. The model information component 102 may obtain model information from one or more locations. For example, the model information component 102 may obtain model information from a storage location, such as the electronic storage 13, electronic storage of a device accessible via a network, and/or other locations. The model information component 102 may obtain model information from one or more hardware components (e.g., a computing device, a component of a computing device) and/or one or more software components (e.g., software running on a computing device). Model information may be stored within a single file or multiple files.

The model information may define a set of computational stratigraphic models. A set of computational stratigraphic models may include one or more stratigraphic models. A computational stratigraphic model may refer to a computer model of underground structures, materials, and/or layers that are built from computational stratigraphy. A computational stratigraphic model may refer to a computer model that simulates and/or includes simulation of depositional and/or stratigraphic processes on a grain size scale while honoring physics-based flow dynamics. A computational stratigraphic model may be converted to rock properties, such as velocity and density, based on rock-physics equations and assumptions. A computational stratigraphic model may include a forward stratigraphic model. A forward stratigraphic model may be fully based on physics of flow and sediment transport. A forward stratigraphic model may simulate and/or include simulation of a sedimentary process that recreates the way stratigraphic successions develop and/or are preserved. The forward stratigraphic model may be used to numerically reproduce the physical processes that eroded, transported, deposited and/or modified the sediments over variable time periods. In a forward modelling approach, data may not be used as the anchor points for facies interpolation or extrapolation. Rather, data may be used to test and validate the results of the simulation. Stratigraphic forward modelling may be an iterative approach, where input parameters have to be modified until the results are validated by actual data.

Individual computational stratigraphic models may include multiple digital wells. For example, the set of computational stratigraphic models defined by the model information may include a first computational stratigraphic model and/or other computational stratigraphic models, and the first computational stratigraphic models may include multiple digital wells. A digital well may refer to a digital hole or a digital tunnel defined by or within a computational stratigraphic model. A digital well may refer to a portion of the model that includes, runs through, and/or exposes different types of simulated layers. A digital well may be characterized by the simulated layers that are included within and/or surround the digital well. A computational stratigraphic model may be built stratigraphy layer by layer, and the chrono- and sequence stratigraphic correlations between any pairs of digital wells in the model may be given by the layers of the computational stratigraphic model. The layers of the computational stratigraphic model may be used to determine connectivity and/or other characteristics of wells/well segments. For example, a computational stratigraphic model may be representative of a reservoir of interest and may provide information on connectivity and/or other characteristics of digital wells/digital well segments within the reservoir of interest. In some implementations, the set of computational stratigraphic model may be scaled with respect to wells defined by the well information.

However, determining correlation of wells by simply matching wells in individual computational stratigraphic model may limit the total number of wells that may be correlated. For example, as the number of wells increases, the probability of matching all wells simultaneously in one computational stratigraphic model decreases rapidly. Consecutive correlation of wells, on the other hand, may not guarantee well tie and may often result in unrealistic solutions.

The well information component 104 may be configured to obtain well information and/or other information. Obtaining well information may include one or more of accessing, acquiring, analyzing, determining, examining, identifying, loading, locating, opening, receiving, retrieving, reviewing, storing, utilizing, and/or otherwise obtaining the well information. The well information component 104 may obtain well information from one or more locations. For example, the well information component 104 may obtain well information from a storage location, such as the electronic storage 13, electronic storage of a device accessible via a network, and/or other locations. The well information component 104 may obtain well information from one or more hardware components (e.g., a computing device, a component of a computing device) and/or one or more software components (e.g., software running on a computing device). Well information may be stored within a single file or multiple files.

The well information may define segments of multiple wells. For example, the multiple wells may include a first well, a second well, and/or other wells. The multiple wells may refer to wells in the real world. The well information may define segments of multiple wells by defining physical properties of the well (e.g., defining rock properties as a function of depth/segments). Physical properties of a well may be determined from one or more well logs, one or more well cores, and/or other information relating to the wells. For example, the well information may include information obtained from borehole logging of the well and may include a record of geologic formations penetrated by a borehole (e.g., geologic formations within/surrounding the well). As another example, the well information may include information obtained from well cores (e.g., rock samples collected as part of drilling process). The well cores may provide information on one or more properties of the drilled rocks, such as rock type, rock porosity, and rock permeability. Other types of well information are contemplated.

The wells defined by the well information may be segmented/discretized into multiple segments. For example, the well information may define a well A and a well B. The well information may define segments of the well A and the well B by defining physical properties of the wells. The well A and the well B may be segmented/discretized into multiple segments. The well A and the well B may be segmented/discretized into same number of segments or different number of segments. In some implementations, the well information may define one or more wells that have been segmented/discretized into multiple segments. In some implementations, the well information may define one or more wells, which may be segmented/discretized into multiple segments.

The generation component 106 may be configured to generate a set of correlation matrices. The set of correlation matrices may include one or more correlation matrices. The set of correlation matrices may include a correlation matrix for individual pairs of the multiple wells. For instance, the set of correlation matrices may include a first correlation matrix for a pair of the first well and the second well, and/or other correlation matrices for other pairs of the multiple wells. The dimensions of correlation matrices may be defined by numbers of segments of the individual pairs of the multiple wells. The dimension of a correlation matrix may be characterized by a number of rows, a number of columns, and/or dimensional characteristics of the correlation matrix. A correlation matrix may be defined as a two-dimensional matrix. The dimension of a correlation matrix may determine the number of elements within the correlation matrix.

Figure 4:
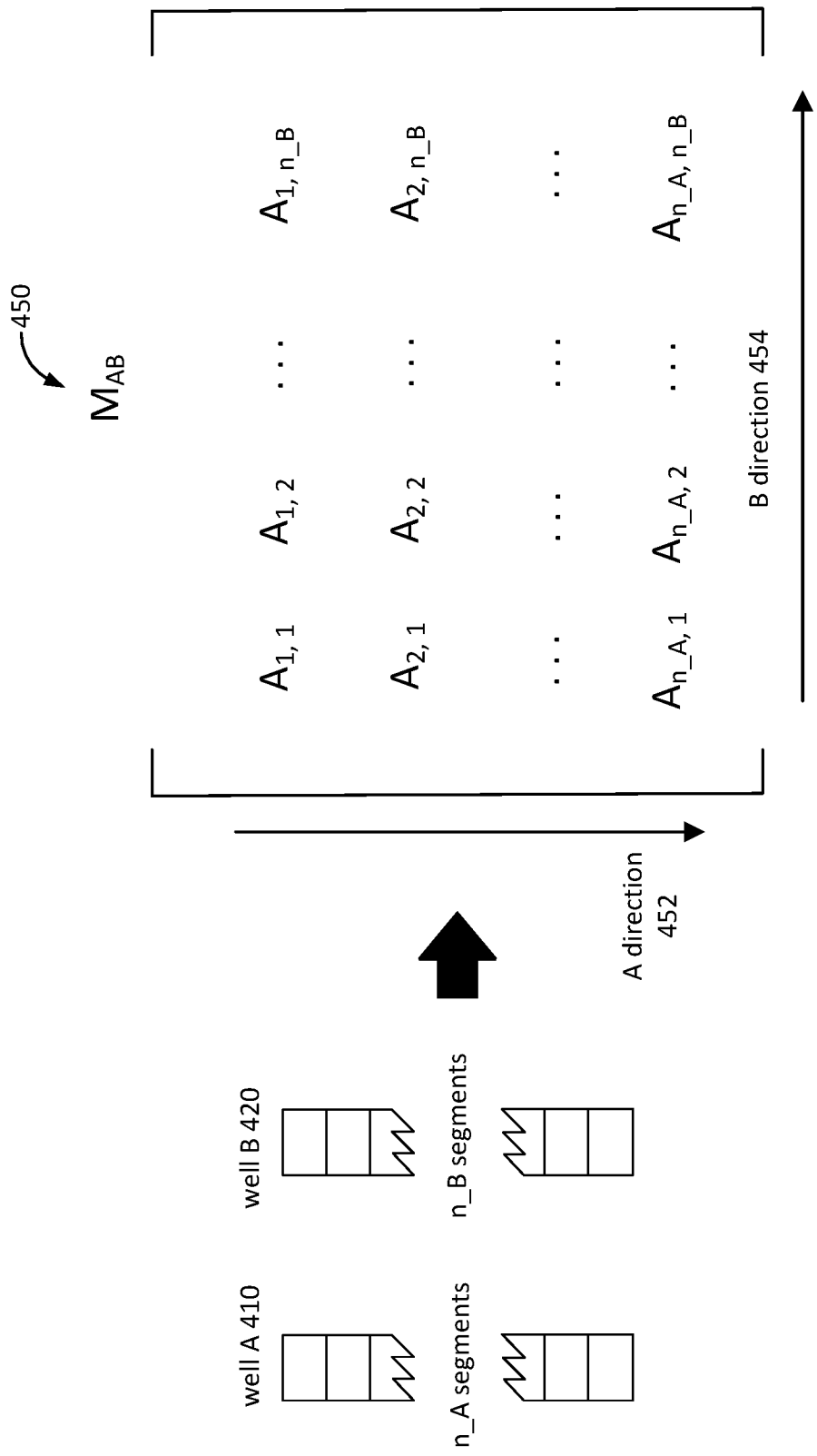
FIG. 4 illustrates an example correlation matrix for a pair of wells.

For example, FIG. 4 illustrates an example correlation matrix for a pair of wells. A well A 410 may include/be discretized into n_A segments, and a well B 420 may include/be discretized into n_B segments. The generation component 106 may generate a correlation matrix $M_{AB}$ 450 for the pair of wells 410, 420. The dimension of the correlation matrix 450 may include a row number of n_A and a column number of n_B. The row direction corresponding to the direction where the size is n_A may be denoted as A direction 452. The column direction corresponding to the direction where the size is n_B may be denoted as B direction 454.

For N wells, N(N-1)/2 number of pairs of may be made, and the set of correlation matrices may include N(N-1)/2 correlation matrices. Individual correlation matrices may correspond to individual pairs of wells W k and W k', where k and k' ranges from 1 to N with k not being equal to k'.

Figure 6:
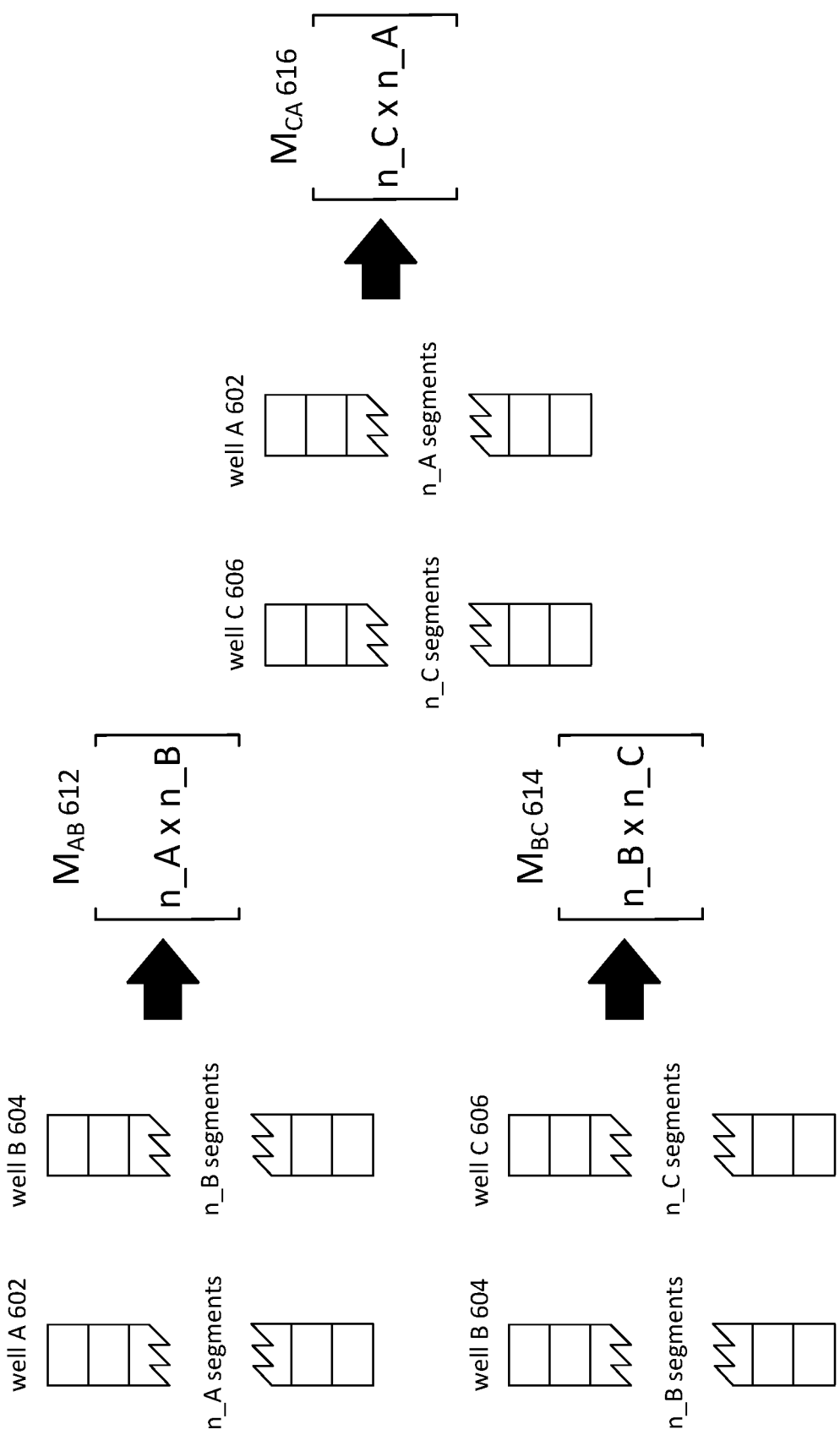
FIG. 6 illustrates example correlation matrices for multiple pairs of wells.

For example, FIG. 6 illustrates example correlation matrices for multiple pairs of wells. A well A 602 may include/be discretized into n_A segments, a well B 604 may include/be discretized into n_B segments, and a well C 604 may include/be discretized into n_C segments. The generation component 106 may generate a correlation matrix $M_{AB}$ 612 for the pair of wells 602, 604, a correlation matrix $M_{BC}$ 614 for the pair of wells 604, 606, and a correlation matrix $M_{CA}$ 616 for the pair of wells 602, 606. The dimension of individual correlation matrices 612, 614, 616 may be defined by numbers of segments of the individual pairs of the multiple wells. For example, based on the well A 602 including 5 segments (n_A=5), the well B 604 including 7 segments (n_B=7), and the well C 604 including 3 segments (n_C=3), the correlation matrix $M_{AB}$ 612 may have a dimension of 5×7, the correlation matrix $M_{BC}$ 614 may have a dimension of 7×3, and the correlation matrix $M_{CA}$ 616 may have a dimension of 3×5. Other numbers and dimensions of correlation matrices are contemplated.

The value component 108 may be configured to determine element values of the set of correlation matrices based on matching between segments of the multiple wells and segments of the multiple digital wells in the set of computational stratigraphic models, and/or other information. Element values may refer to values of elements within individual correlation matrices. The element values of the set of correlation matrices may be determined based on a number of scenarios in which chrono- and/or sequence correlations are found between a pair of wells through the set of computational stratigraphic models.

For example, element values of the first correlation matrix may be determined based on matching between the segments of the first well, the segments of the second well, and the segments of matched digital wells in the set of computational stratigraphic models (e.g., first computational stratigraphic model), and/or other information. Matched digital wells in the set of computational stratigraphic models may refer to digital wells that matches one or more of the multiple wells (e.g., the first well, the second well).

Matching between segments of multiple wells and segments of multiple digital wells may include matches between individual wells and individual digital wells. A computational stratigraphic model including digital wells may define correlations between the digital wells, and the correlations between the digital wells in the computational stratigraphic model may be used to determine correlations (instance/scenario of correlation) between the wells in the real world.

For example, the wells may include a well A and a well B, and a computational stratigraphic model may include a digital well A' and a digital well B'. The segments of well A may match the segments of digital well A', and the segments of well B may match the segments of digital well B'. Matching between segments of a real well and a digital well may be determined based on similarity of physical properties of the real well and the simulated properties of the digital well (defined by the computational stratigraphic model). For example, lithological comparison may be performed to find in the computational stratigraphic model a digital well A' that matches the well A and a digital well B' that matches the well B, with matching determined based on a well and a corresponding matched digital well exhibiting the same properties, similar properties, and/or properties within one or more thresholds. The matching may also be determined based on the digital wells A' and B' exhibiting the same relative properties, similar relative properties, and/or relative properties within one or more thresholds as between wells A and B. For example, matching of wells A and B to the digital wells A' and B', respectively, may be determined based on the distance between the digital wells A' and B' being the same, similar, and/or within a threshold of the distance between the wells A and B and/or the orientation of the digital wells A' and B' being the same, similar and/or within a threshold of the orientation between the wells A and B.

In some implementations, one or more well-log matching techniques may be used to find the same/similar lithological distribution in the well/segment locations. Once matched digital wells are found within the computational stratigraphic model, the correlations between the segments of the matched digital wells, as defined by the computational stratigraphic model, may be used to determine the correlations (instance/scenario of correlation) between the wells. For example, once matched digital wells A' and B' are found within the computational stratigraphic model, the correlations between the segments of digital wells A' and B', as defined by the computational stratigraphic model, may be used to determine the correlations (instance/scenario of correlation) between wells A and B.

Thus, in the above example, a scenario of chrono- and/or sequence stratigraphic correlation between wells and B may be obtained based on matching between the segments of the well A, the segments of the well B, and the segments of the matched digital wells in the computational stratigraphic model. Matching between the segments of the well A, the segments of the well B, and the segments of the matched digital wells in the computational stratigraphic model may include: matching between the segments of the well A and segments of the digital well A' of the computational stratigraphic model; matching between the segments of the well B and segments of the digital well B' of the computational stratigraphic model; and obtaining correlation between the segments of the digital well A' and the segments of the digital well B' from the computational stratigraphic model. The correlation between the well A (segments of well A) and the well B (segments of well B) may be equivalent to the correlation between the digital well A' (segments of digital well A') and the digital well B' (segments of digital well B'), as defined by the computational stratigraphic model.

Matching between the segments of multiple wells through digital wells in the set of computational stratigraphic models may be determined for individual computational stratigraphic models and/or for individual pairs of wells. Matching between the segments of multiple wells through digital wells in the set of computational stratigraphic models may include a single match within a single computational stratigraphic model, multiples matches within a single computational stratigraphic model, or multiple matches within multiple computational stratigraphic model. For example, comparison of the segments of the wells A and B with a computational stratigraphic model may result in one digital well (A') matching the well A and one digital well (B') matching the well B. As an example, comparison of the segments of the wells A and B with a computational stratigraphic model may result in multiple digital wells (A', A'', etc.) matching the well A and/or multiple digital wells (B', B'', B''', etc.) matching the well B. Individual pairs of matched digital wells (A' and B', A' and B'', A' and B''', A'' and B', A'' and B'', A'' and B''', etc.) may provide a scenario of chrono- and/or sequence correlations for the wells A and B. The scenario of chrono- and/or sequence correlation may include mapping between any discretized segments i in a well (e.g., the well A) to a discretized segment j in another well (e.g., the well B). For every pair of correlated segment (i, j) between two wells (e.g., the wells A and B), the corresponding element value in the correlation matrix (correlation matrix $M_{AB}$) may be changed (e.g., a constant value added to the element).

In some implementations, the element values of the correlation matrices (e.g., the first correlation matrix) may be initialized to a certain number, such as zero. Initialization of element values to other numbers are contemplated. The element values of the correlation matrices may be changed based on matching between segments of the corresponding wells and the segments of matched digital wells in the set of computational stratigraphic models. Changes in the element values of the correlation matrices may include the same/ constant change per matching, such as incrementation of the corresponding element value for every instance (scenario) in which chrono -and/or sequence correlations are found between segments of a pair of wells through the set of computational stratigraphic models (through the matched digital wells in the computational stratigraphic model(s)).

For example, one instance of chrono- and/or sequence correlations between the well A and the well B may be found through the digital well A' and the digital well B'. The correlations between the digital well A' and the digital well B', as defined by the computational stratigraphic model, may include correlation between the first segment of digital well A' and the first segment of the digital well B'. Based on the correlation between the digital wells A' and B', the element value of the correlation matrix for the wells A and B that represents the first segment of the well A and the first segment of the well B may be incremented. For instance, referring to FIG. 4, the element value of $A_{1,1}$ may be incremented based on one instance of chrono- and/or sequence correlations between the first segment of the well A and the first segment of the well B found through the correlations between the digital well A' and the digital well B'. A constant value may be added to the element of the correlation matrix that correspond to the pair of correlated segments.

In some implementations, the element values of the correlation matrices (e.g., the first correlation matrix) may be normalized based on a number of scenarios of matching between corresponding wells through the matched digital wells in the set of computational stratigraphic models and/or other information. For example, nine instances of chrono- and/or sequence correlations may be found between the wells A and B through one or more computational stratigraphic models. After appropriate changes (e.g., incrementation) to the values of the elements of the correlation matrix that correspond to individual pairs of correlated segments, all element values of the correlation matrix may be divided by nine. If element values are incremented by "one" for individual matching scenario, then normalization of the element values based on the number of scenarios of matching may result in the element values having a maximum value of "1." That is, an element of the correlation matrix may have a value of "1" if the segments of wells A and B corresponding to that element are correlated in all of the scenarios of matching.

Matching between the segments of multiple wells through digital wells in the set of computational stratigraphic models and changing of the element values of the corresponding correlation matrices may be performed for individual pairs of well/individual correlation matrices. Individual correlation matrices may include element values that represent the likelihood that a segment i in one well (e.g., the well A) is chrono- and/or sequence stratigraphically correlated to a segment j in another well (e.g., the well B) based on matching through set of computational stratigraphic models. Individual correlation matrices may represent probabilistic correlation between particular pairs of wells.

In some implementations, one or more non-linear transformations may be applied to the element values of the correlation matrices (e.g., the first correlation matrix). A non-linear transformation may refer to a transformation that non-linearly changes one or more element values of the correlation matrices. The non-linear transformation may non-linearly change the element value(s) of the correlation matrices such that values of more likely correlated segments are changed differently from values of less likely correlated segments. For example, the non-linear transformation may change the values of more likely correlated segments less than the values of less likely correlated segments. An example non-linear transformation includes a power function of v=pow(v, alpha), with v representing the ensemble likelihood for individual matrix elements. If alpha has a value that is greater than 1, most likely correlated segments may have disproportionally high probabilities of being preserved. Other non-linear transformations are contemplated.

The correlation component 110 may be configured to determine correlations for the segments of the multiple wells based on the element values of the set of correlation matrices and/or other information. The correlations for the segments of the multiple wells may be determined based on the element values of one or more correlation matrices. The correlations for the segments of the multiple wells may be determined deterministically and/or probabilistically based on the element values of one or more correlation matrices.

In some implementations, determination of the correlations for the segments of the multiple wells based on the element values of the set of correlation matrices may include generation of one or more paths within the set of correlation matrices. Individual ones of the paths may represent a scenario of the correlations for the segments of the multiple wells such that a first path within the first correlation matrix may represent a first scenario of the correlations for the segments of the first well and the segments of the second well.

The path(s) may be generated based on one or more directed walks within the set of correlation matrices and/or other information. The directed walk(s) may be performed probabilistically and/or deterministically. A probabilistic performance of a directed walk may include a directed walk that utilizes likelihood of element values to form one or more paths within a correlation matrix. A deterministic performance of a directed walk may include a directed walk that results in one or more paths that satisfy one or more conditions of outcome. For example, a deterministic performance of a directed walk within a correlation matrix may include a directed walk that finds the shortest path within the correlation matrix while a probabilistic performance of a directed walk within a correlation matrix may include a directed walk that generates multiple scenarios of correlations that meet one or more criteria of movement within the correlation matrix.

Figure 5:
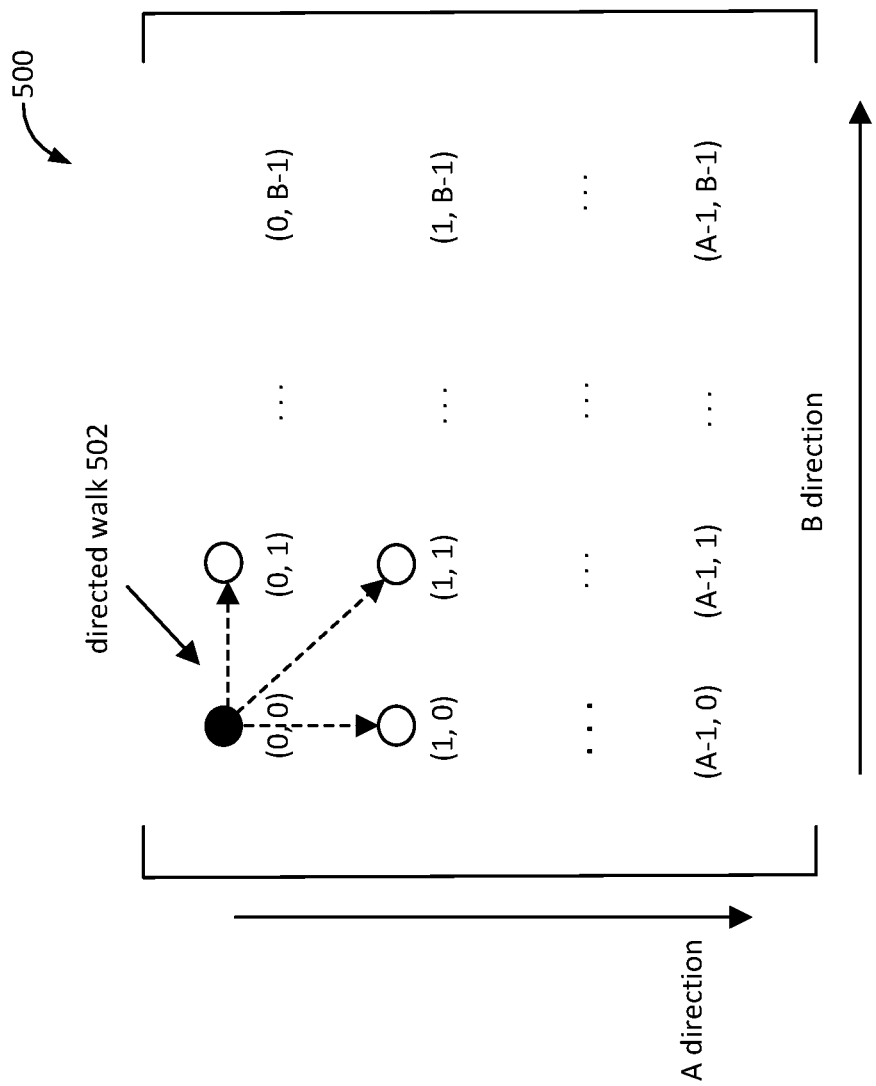
FIG. 5 illustrates example potential movements of a directed walk within a correlation matrix.

For example, FIG. 5 illustrates example potential movements of a directed walk 502 within a correlation matrix 500. The correlation matrix 500 may be generated between a direction corresponding to the number of segments in the well A (e.g., y-axis) and a direction corresponding to the number of segments in the well B (e.g., x-axis). The directed walk 502 may be performed from the starting element (0,0), with three possible walk directions (1,0), (1,1) and (0,1). The direction of the directed walk 502 in any particular direction may be determined deterministically and/or probabilistically based on the value of the element in the correlation matrix 500 at each of the three candidate locations relative to the current location (i, j).

A scenario of chrono- and/or sequence stratigraphic correlation between wells A and B may be represented as a path within the correlation matrix 500. Multiple scenarios of correlation between wells A and B may be represented as multiple paths within the correlation matrix 500. A total likelihood score may be determined for individual paths. If the score is f_i,j at the step when the head of the path is at (i, j) location, the likelihood score of the path in the next step may be one of the following three: (a) f_i+1, j=f_i,j+v (i+1, j); (b) f_i, j+1=f_i, j+v(i, j+1) and (c) f_i+1, j+1=i, j+0.5(v(i,j)+v(i+1,j+1))+v(i+1,j+1).

One or more of the paths may be selected as a scenario of a chrono- and/or sequence stratigraphically correlation between the wells A and B. For example, path(s) that have favorable path likelihood scores may be selected scenario(s) of a chrono- and/or sequence stratigraphically correlation between the wells A and B.

Weight of elements in the correlation matrix 500 may be changed (e.g., increased) based on travel of the path(s) through the elements. Accumulation of the paths may result in one or more segments of the well A having high/higher probability of correlation to one or more segments of the well B. Elements of the matrix 500 with more overlaps between paths may result in greater weights, indicating higher probability of correlation between the corresponding segments of the wells A and B.

In some implementations, determination of the correlations for the segments of the multiple wells based on the element values of the set of correlation matrices may include generation of an N-dimensional space. For multiple pairs of well/multiple correlation matrices (individually representing probabilistic correlation between different pairs of wells), a single N-dimensional space may be generated. An N-dimensional space may refer to a vector space having N-vectors as its basis. An N-dimensional space may refer to a hyper-dimensional space. The N-dimensional space may include an axis corresponding to individual ones of the multiple wells. Vertices of the N-dimensional space may be projected onto the axis corresponding to individual wells of the multiple wells and individual correlation matrices of the set of correlation matrices.

Figure 7:
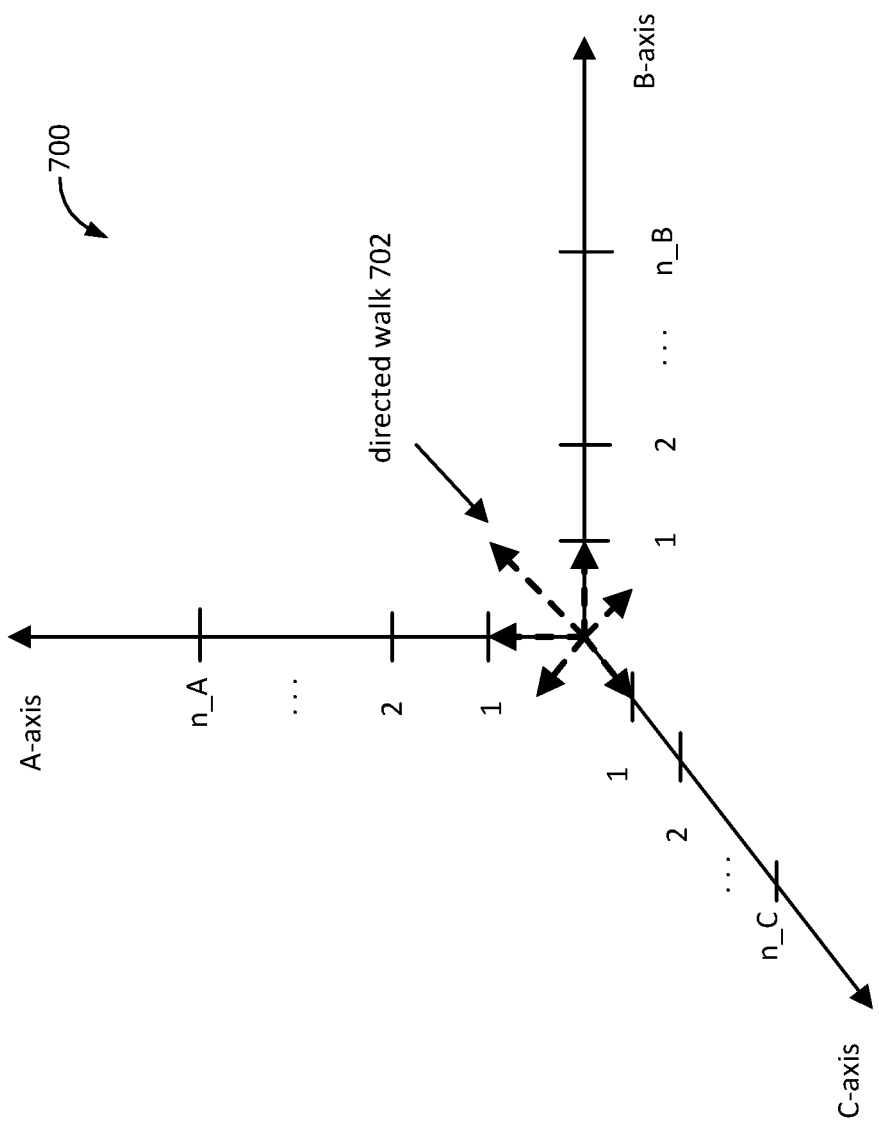
FIG. 7 illustrates an example N-dimensional space.

For example, the multiple wells may include a well A, a well B, and a well C. The set of correlation matrices may include a correlation matrix $M_{AB}$ for the pair of wells A and B, a correlation matrix $M_{BC}$ for the pair of wells B and C, and a correlation matrix $M_{CA}$ for the pair of wells A and C. FIG. 7 illustrates an example N-dimensional space 700 generated for the wells A, B, and C/correlation matrices $M_{AB}$, $M_{BC}$, $M_{CA}$. The N-dimensional space 700 may include three dimensions defined by three axis. N-dimensional space with other number of dimensions are contemplated.

The N-dimensional space 700 may include an axis (A-axis) corresponding to the well A, an axis (B-axis) corresponding to the well B, and an axis (C-axis) corresponding to the well C. The individual axis may have same number of segments as the number of segments in the corresponding well. The A-axis may have n_A segments, the B-axis may have n_B segments, and the C-axis may have n_C segments. Surfaces formed by a pair of axis (representing two wells) may include/be a correlation matrix for the two wells. For example, the surface formed by the A-axis and the B axis may include/be the correlation matrices $M_{AB}$. The surface formed by the B-axis and the C axis may include/be the correlation matrices $M_{BC}$. The surface formed by the A-axis and the C axis may include/be the correlation matrices $M_{CA}$. Thus, generation of the N-dimensional space may include accumulation, aggregation, and/or conversion of two-dimensional correlational matrices into the N-dimensional space.

For individual axis that corresponds to a well k, a unit vector may be defined as (0, 0, . . . 1, . . . 0), where the kth element has the value of "1." In the N-dimensional space, individual vertex may be represented by a vector with coordinate (i1, i2, i3, . . . i_k, . . . i_N), where k=1, 2, . . . N. Individual vertices may be projected to any of the axis, corresponding to a well, by a dot product between the unit vector corresponding to that well, and the vector of the vertices: i_k=(0, 0, . . . , 1, . . . 0)·(i1, i2, i3, . . . i_k, . . . i_N). Similarly, individual vertices (i1, i2, i3, . . . i_k, . . . i_N) in the N-dimensional space may be projected to individual correlation matrix M_k,k' at the matrix element (i_k, i_k').

In some implementations, the directed walk within the set of correlation matrices may be performed within the N-dimensional space. For example, FIG. 7 illustrates example potential movements of a directed walk 702 within the N-dimensional space 700.

The directed walk (e.g., the directed walk 702) may be performed from starting point at the matrix element (0, 0, . . . 0), with $2^{N-1}$ possible walk directions. The directions may be enumerated by counting from number 1 to $2^{N-1}$ in their respective binary form: (0, 0, 0, . . . 0, 1), (0, 0, 0, . . . 1, 0), (0, 0, 0, . . . 1, 1), . . . , (1, 1, 1, . . . 1, 1). For instance, with respect to the N-dimensional space 700, the directed walk 702 may be performed from the element (0, 0, 0), with seven possible walk directions (0, 0, 1), (0, 1, 0), (0, 1, 1), (1, 0, 0), (1, 0, 1), (1, 1, 0), (1, 1, 1). FIG. 7 shows six of the seven possible walk directions. The direction of the directed walk (e.g., the directed walk 702) in any particular direction may be determined deterministically or probabilistically based on the values of the element in each of the N(N-1) correlation matrices at the location projected from each of the $2^{N-1}$ possible candidate locations from current location (i1, i2, i3, . . . i_k, . . . i_N). For example, the directed walk may be performed with smallest values in the N-dimensional space with each directed walk step having a cost that is given by the value in the sets of correlation matrices.

A scenario of chrono- and/or sequence stratigraphic correlation between all wells (corresponding to axes of the N-dimensional space) may be represented as a path within the N-dimensional space. Multiple scenarios of correlation between all wells may be represented as multiple paths within the N-dimensional space. A total likelihood score may be determined for individual paths. If the score is f(i1, i2, i3, . . . i_k, . . . i_N) at the step when the head of the path is at location (i1, i2, i3, . . . i_k, . . . i_N) in the N-dimensional space, the likelihood score of the path in the next step may be computed as following: (1) if the projection of the proposed path on the correlation matrix M_k, k' corresponds to the move direction (1,1) on the matrix, the score f may be increased by the amount given by 0.5(v_kk'(i_k,i_k')+v_kk' (i_k+1,i_k'+1))+v_kk'(i_k+1,k'+1); (2) if the projection of the proposed path on the correlation matrix M_k,k' corresponds to the move directions of either (1,0), or (0,1), the score f may be increased by the amount given by v_kk'(i_k+1, i_k') or by v_kk'(i_k, i_k'+1) respectively; (3) if the projection of the proposed path on the correlation matrix M_kk' corresponds to no move on that matrix (move of (0,0)), the score f may not be increased from this correlation matrix. The total increase of the score f may be the sum over all N(N-1) correlation matrix elements.

One or more of the paths may be selected as a scenario of a chrono- and/or sequence stratigraphically correlation between all wells represented by the N-dimensional space.

For example, for any pairs of wells k and k', the chrono- and/or sequence stratigraphic correlations may be given by the projections of the selected N-dimensional path projected to the surface defined by the two unit vectors corresponding to the wells k and k'. That is, individual paths may represent a scenario of the correlations for the segments of all pairs of the multiple wells, and a scenario of correlations for the segments of two wells may be determined based on a projection of a path within the N-dimensional space to a surface defined by a first unit vector corresponding to one well and a second unit vector corresponding to the other well.

Thus, the set of correlation matrices may provide a mechanism to mathematically synthetize all correlations and generate multiple correlations between wells. The set of correlation matrices in the N-dimensional space may be used to simultaneously correlate more than two wells. The set of correlation matrices may be used to extract stratigraphic information from the set of stratigraphic computational models and synthetize them into correlations between real wells. Use of multiple computational stratigraphic models for well correlations may enable correlations to be simultaneously determined for numerous wells, with no practical limits to the number of wells to be correlated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
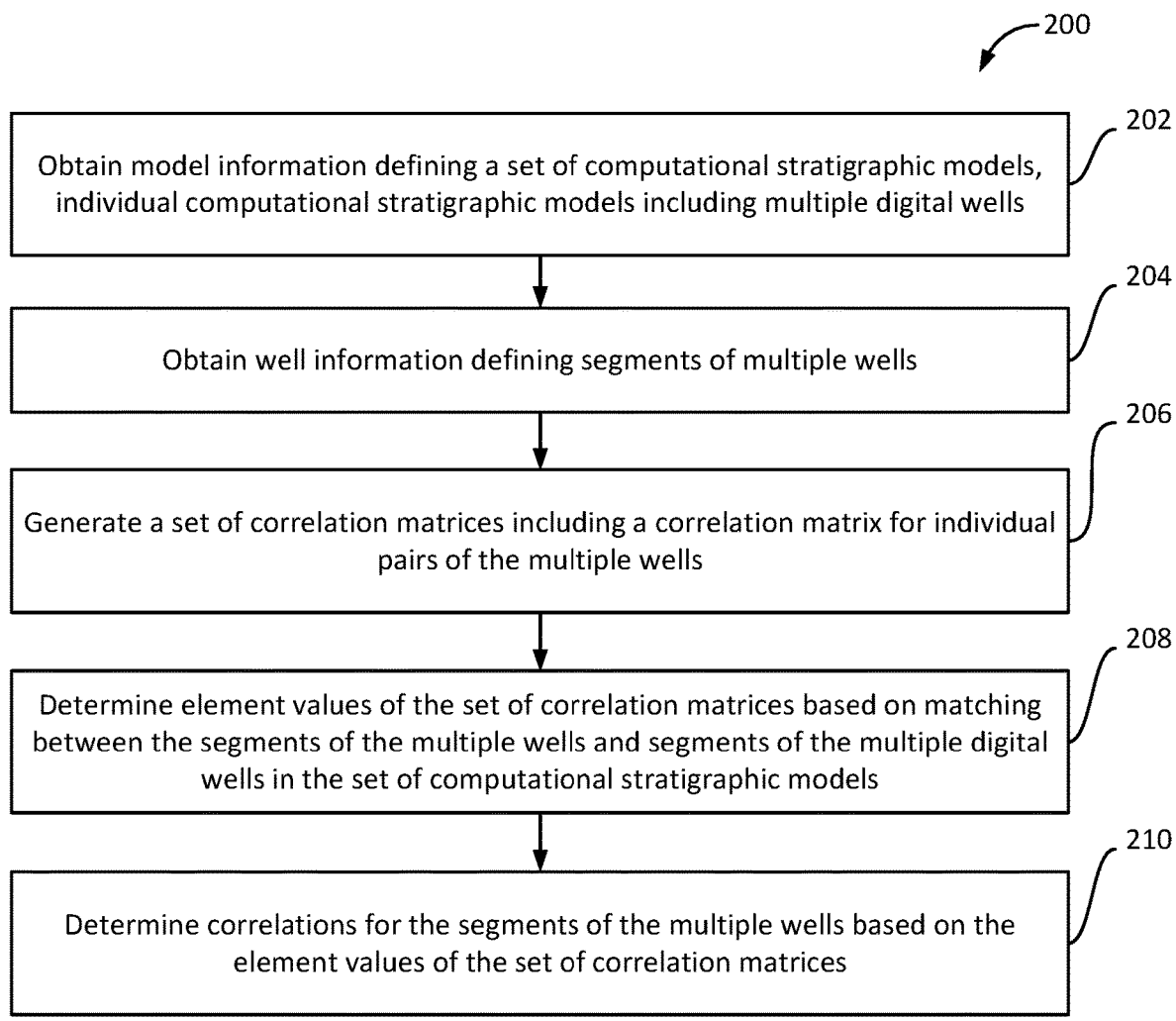
FIG. 2 illustrates an example method for correlating multiple wells.

FIG. 2 illustrates method 200 for correlating multiple wells. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, At operation 202, model information may be obtained. The model information may define a set of computational stratigraphic models. Individual computational stratigraphic models may include multiple digital wells. The set of computational stratigraphic models may include a first computational stratigraphic model and/or other computational stratigraphic models. In some implementation, operation 202 may be performed by a processor component the same as or similar to the model information component 102 (Shown in FIG. 1 and described herein).

At operation 204, well information may be obtained. The well information may define segments of multiple wells. The multiple wells may include a first well, a second well, and/or other wells. In some implementation, operation 204 may be performed by a processor component the same as or similar to the well information component 104 (Shown in FIG. 1 and described herein).

At operation 206, a set of correlation matrices may be generated. The set of correlation matrices may include a correlation matrix for individual pairs of the multiple wells. The set of correlation matrices may include a first correlation matrix for the first well and the second well and/or other correlation matrices for other pairs of the multiple wells. A dimension of a correlation matrix may be defined by numbers of segments of the individual pairs of the multiple wells. In some implementation, operation 206 may be performed by a processor component the same as or similar to the generation component 106 (Shown in FIG. 1 and described herein).

At operation 208, element values of the set of correlation matrices may be determined based on matching between the segments of the multiple wells and segments of the multiple digital wells in the set of computational stratigraphic models, and/or other information. Element values of the first correlation matrix may be determined based on matching between the segments of the first well, the segments of the second well, and the segments of matched digital wells in the set of computational stratigraphic models, and/or other information. In some implementation, operation 208 may be performed by a processor component the same as or similar to the value component 108 (Shown in FIG. 1 and described herein).

At operation 210, correlations for the segments of the multiple wells may be determined based on the element values of the set of correlation matrices and/or other information. In some implementation, operation 210 may be performed by a processor component the same as or similar to the correlation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for correlating multiple wells, the system comprising:
one or more physical processors configured by machine-readable instructions to:
obtain model information, the model information defining a set of computational stratigraphic models, individual computational stratigraphic models including multiple digital wells, the set of computational stratigraphic models including a first computational stratigraphic model;
obtain well information, the well information defining segments of multiple wells, the multiple wells including a first well, a second well, and a third well;
generate a set of correlation matrices, the set of correlation matrices including multiple correlation matrices for multiple pairs of the multiple wells, the set of correlation matrices including a first correlation matrix for the first well and the second well, a second correlation matrix for the second well and the third well, and a third correlation matrix for the first well and the third well, wherein dimensions of the multiple correlation matrices are defined by numbers of segments of the multiple pairs of the multiple wells;
determine element values of the set of correlation matrices based on (1) matching between the segments of the multiple wells and segments of the multiple digital wells in the set of computational stratigraphic models, and (2) correlation between the segments of the multiple digital wells in the set of computational stratigraphic models, wherein element values of the first correlation matrix is determined based on matching between the segments of the first well and segments of a first digital well of the first computational stratigraphic model, matching between the segments of the second well and segments of a second digital well of the first computational stratigraphic model, and the correlation between the segments of the first digital well and the segments of the second digital well in the first computational stratigraphic model;
generate an N-dimensional space for the set of correlation matrices, the N-dimensional space including multiple axes corresponding to the multiple wells and surfaces formed by the different axes including corresponding correlation matrices, wherein the N-dimensional space includes a first axis corresponding to the first well, a second axis corresponding to the second well, and a third axis corresponding to the third well, a first surface formed by the first axis and the second axis that includes the first correlation matrix for the first well and the second well, a second surface formed by the second axis and the third axis that includes the second correlation matrix for the second well and the third well, and a third surface formed by the first axis and the third axis that includes the third correlation matrix for the first well and the third well; and generate a path through the N-dimensional space based on the element values of the set of correlation matrices, wherein the generation of the path results in simultaneous correlation between the segments of individual pairs of the multiple wells such that the generation of the path results in simultaneous correlation between the segments of the first well and the second well, between the segments of the second well and the third well, and between the segments of the first well and the third well, wherein establishing the correlation between the segments of the individual pairs of the multiple wells includes determining connection, correspondence, and/or relationship between the segments of the individual pairs of the multiple wells, wherein determining the connection, the correspondence, and/or the relationship between the segments of the individual pairs of the multiple wells includes determining that the segments of the individual pairs of the multiple wells (1) are deposited at same time or (2) have similar or related characteristics.

2. The system of claim 1, wherein:
the element values of the first correlation matrix are initialized to zero; and
the element values of the first correlation matrix corresponding to matching between the segments of the first well, the segments of the second well, and the segments of the matched digital wells in the set of computational stratigraphic models that are correlated are incremented.

3. The system of claim 2, wherein the element values of the first correlation matrix are normalized based on a number of scenarios of matching between the first well and the second well through the matched digital wells in the set of computational stratigraphic models.

4. The system of claim 3, wherein a non-linear transformation is applied to the element values of the first correlation matrix.

5. The system of claim 1, wherein the path is generated through the N-dimensional space based on a directed walk well.

6. The system of claim 5, wherein the directed walk is performed probabilistically or deterministically.

7. The system of claim 1, wherein vertices of the N-dimensional space are projected onto the axis corresponding to the individual ones of the multiple wells and individual ones of the set of correlation matrices.

8. The system of claim 1, wherein multiple paths are generated through the N-dimensional space, individual ones of the paths representing separate scenarios of the correlation between the segments of all pairs of the multiple wells.

9. The system of claim 8, wherein a first scenario of the correlation between the segments of the first well and the segments of the second well is determined based on a projection of a first path within the N-dimensional space to a surface defined by a first unit vector corresponding to the first well and a second unit vector corresponding to the second well.

10. A method for correlating multiple wells, the method comprising:
obtaining model information, the model information defining a set of computational stratigraphic models, individual computational stratigraphic models including multiple digital wells, the set of computational stratigraphic models including a first computational stratigraphic model;
obtaining well information, the well information defining segments of multiple wells, the multiple wells including a first well, a second well, and a third well;
generating a set of correlation matrices, the set of correlation matrices including multiple correlation matrices for multiple pairs of the multiple wells, the set of correlation matrices including a first correlation matrix for the first well and the second well, a second correlation matrix for the second well and the third well, and a third correlation matrix for the first well and the third well, wherein dimensions of the multiple correlation matrices are defined by numbers of segments of the multiple pairs of the multiple wells;
determining element values of the set of correlation matrices based on (1) matching between the segments of the multiple wells and segments of the multiple digital wells in the set of computational stratigraphic models, and (2) correlation between the segments of the multiple digital wells in the set of computational stratigraphic models, wherein element values of the first correlation matrix is determined based on matching between the segments of the first well and segments of a first digital well of the first computational stratigraphic model, matching between the segments of the second well and segments of a second digital well of the first computational stratigraphic model, and the correlation between the segments of the first digital well and the segments of the second digital well in the first computational stratigraphic model;
generating an N-dimensional space for the set of correlation matrices, the N-dimensional space including multiple axes corresponding to the multiple wells and surfaces formed by the different axes including corresponding correlation matrices, wherein the N-dimensional space includes a first axis corresponding to the first well, a second axis corresponding to the second well, and a third axis corresponding to the third well, a first surface formed by the first axis and the second axis that includes the first correlation matrix for the first well and the second well, a second surface formed by the second axis and the third axis that includes the second correlation matrix for the second well and the third well, and a third surface formed by the first axis and the third axis that includes the third correlation matrix for the first well and the third well; and
generating a path through the N-dimensional space based on the element values of the set of correlation matrices, wherein the generation of the path results in simultaneous correlation between the segments of individual pairs of the multiple wells such that the generation of the path results in simultaneous correlation between the segments of the first well and the second well, between the segments of the second well and the third well, and between the segments of the first well and the third well, wherein establishing the correlation between the segments of the individual pairs of the multiple wells includes determining connection, correspondence, and/or relationship between the segments of the individual pairs of the multiple wells, wherein determining the connection, the correspondence, and/or the relationship between the segments of the individual pairs of the multiple wells includes determining that the segments of the individual pairs of the multiple wells (1) are deposited at same time or (2) have similar or related characteristics.

11. The method of claim 10, wherein:
the element values of the first correlation matrix are initialized to zero; and
the element values of the first correlation matrix corresponding to matching between the segments of the first well, the segments of the second well, and the segments of the matched digital wells in the set of computational stratigraphic models that are correlated are incremented.

12. The method of claim 11, wherein the element values of the first correlation matrix are normalized based on a number of scenarios of matching between the first well and the second well through the matched digital wells in the set of computational stratigraphic models.

13. The method of claim 12, wherein a non-linear transformation is applied to the element values of the first correlation matrix.

14. The method of claim 10, wherein the path is generated through the N-dimensional space based on a directed walk.

15. The method of claim 14, wherein the directed walk is performed probabilistically or deterministically.

16. The method of claim 10, wherein vertices of the N-dimensional space are projected onto the axis corresponding to the individual ones of the multiple wells and individual ones of the set of correlation matrices.

17. The method of claim 10, multiple paths are generated through the N-dimensional space, individual ones of the paths representing separate scenarios of the correlation between the segments of all pairs of the multiple wells.

18. The method of claim 17, wherein a first scenario of the correlation between the segments of the first well and the segments of the second well is determined based on a projection of a first path within the N-dimensional space to a surface defined by a first unit vector corresponding to the first well and a second unit vector corresponding to the second well.

* * * * *